FIP8102 XR 2,757,239

July 31, 1956 P. B. PATTON 2,757,239

CARRIER FREQUENCY CONTROL SYSTEM

Filed July 20, 1951

INVENTOR.
Philips B. Patton
BY
Lippincott & Smith
ATTORNEYS

2757239
OR IN 179/15BP

United States Patent Office 2,757,239
Patented July 31, 1956

2,757,239

CARRIER FREQUENCY CONTROL SYSTEM

Philips B. Patton, Palo Alto, Calif., assignor to Lenkurt Electric Co., Inc., San Carlos, Calif., a corporation of Delaware Application July 20, 1951, Serial No. 237,749

4 Claims. (Cl. 179—15)

This invention relates to communication systems, and its primary purpose is improving the quality of transmission of the circuits over which such communication is established. While the system of this invention is primarily intended for use in multichannel radio telephone systems wherein one or all of the channels may be in use at any one time, in certain of its aspects it is applicable to substantially all types of communication systems wherein the average amplitude of the signals supplied to the system varies from time to time, whether the average be taken over a period of approximately a single syllable of ordinary speech or integrated over a much larger period, such as the length of time when any given number of channels of a multichannel system are in use.

Defining "noise" as any deviation of waveform in a received signal from the waveform of the signal as supplied to the system, the quality of transmission over a system may be expressed as a signal-to-noise ratio. This definition would include, in the definition of noise, any proportional variations in amplitude between components of different frequencies, and is thus more rigorous than that ordinarily used. In ordinary telephone circuits, deviations of the character just mentioned are not particularly important in that they may not appreciably affect intelligibility of the transmitted signal, and in the description which follows "noise," will be defined as any components in the received signal of frequencies not present in the signal as transmitted.

It will be seen that even with this more restricted definition, noise may originate in any portion of the system. Modulators may be so constructed that so long as the amplitude of the signal which is fed to them remains within the limits for which the system was designed, the amount of distortion or noise introduced is extremely small; its level may be kept 60 db or more beneath the level of the signal itself. If the designed limits of the system are exceeded, however, the percentage of distortion rises very rapidly. The point at which this occurs, which will hereinafter be referred to as "100% modulation," is an absolute value in the case of amplitude modulated systems, 100% modulation occurring when the amplitude of the signal is reduced to zero on the negative swings of the signal. In frequency modulation systems, the 100% modulation point is not so clearly defined, but for the purposes of this disclosure it may be taken as the point when the variation in frequency in the transmitted signal exceeds that arbitrarily assigned when the system was designed.

Noise arises due to electrical disturbances on the communication link itself. Examples of this are induction from power lines in wire communication circuits, or, in the case of radio links, "static" either "man-made" or natural static, as from electrical or magnetic storms. In amplitude modulated radio systems, interference of this character is heard directly as crashing, his sign, or the like; in frequency modulated systems, which are much more noise resistant, the noise usually appears as distortions in the waveforms of the received signals rather than as direct crashes. The receiver also contributes noise. That so contributed is primarily thermal noise or "shot noise," due, respectively, to thermal agitation of the molecules of circuit elements of the receiver or to non-uniform emission of electrons from the cathodes of receiving tubes. When the receivers are operating on signals of normal values, such thermal noise is at so low a relative level that it may be neglected, but if the received signal is weak, due to fading or the like, the receiver noise may become a very important portion of the whole. Its effects are substantially similar to those of circuit noise, depending, in nature, upon whether the form of modulation employed is amplitude modulation, frequency modulation, or modulation of some other type.

As has been indicated, the importance of the noise component of a received signal is not measured by the absolute value of the noise itself but rather by the ratio of the signal power in the output of the receiving end of the system to the noise power in that same output. In a high quality system, this ratio will be of the order of 60 db, and the circuit will be so designed that one-half of this noise is referable to transmitter distortion and the other one-half to circuit and receiver noise. Increasing the degree of modulation of the transmitter will increase the signal-to-noise ratio, making for better transmission, as long as the percentage of modulation does not exceed 100%. Increasing the power fed to the transmitter above the 100% modulation point, however, will not increase the power in the received signal to any material extent, but will merely add to the noise. It follows that, in general, the best signal-to-noise ratio is obtained at 100% modulation of the transmitter.

It should be noted here, however, that in the case of voice signals in particular, "100% modulation" does not mean modulation which averages 100%, but merely that the modulation does not exceed 100% at the peaks of signal energy. The peaks in speech power may carry energy many times the average energy of the speech, and in all parctical voice communication systems allowance is made for this fact. Signals are supplied to the system at an average level, integrated over a greater or less time, which experience has shown will allow sufficient reserve capacity in the modulators, repeaters, receivers, or other components of the system to prevent distortions from occurring from inability to handle the energy of the peak power.

The reserve capacity of the system required to take care of such peaks, and, further, to handle normal variations in speech level of longer duration, results in a relatively large reduction in signal-to-noise ratio in comparison with that which would be possible were the level of the signals supplied to the system to be held constant. One approach to the problem of maintaining the best signal-to-noise ratio has been the provision of "compandors" or compressor-expanders, which vary the gain of the signal as an inverse function of the signal power in a speech channel at the transmitting end of the system and apply a correction of opposite sign at the receiving end. The level of the speech, as carried over the communication link, therefore varies from instant to instant, usually at a syllabic rate, but to a lesser degree than in the original speech. The expander at the receiving end operates to increase the gain applied to the signal in proportion to the amplitude of the signal itself. While an effective device, it is essentially regenerative and hence inherently unstable and so requires careful selective matching of the elements in the expander device in order to prevent its "singing" and thus introducing an intolerable noise of its own.

In multichannel communication systems, particularly in those of the carrier type, the voice signal on each channel (with the possible exception of one) is shifted to a different frequency by modulation on a carrier and the entire group of signals transmitted together. In radio circuits, the carriers mentioned are sub-carriers which are in turn modulated upon a main carrier wave, either with or without preliminary group modulations on intermediate sub-carriers. Secondary modulation is also frequently employed in the case of transmission over metallic circuits. In any case, however, the repeaters, modulators, and other devices employed in the transmission must be designed with sufficient latitude to carry, simultaneously, signals from all of the channels for which the system is designed.

Consider, for purposes of illustration, a multichannel radio communication circuit designed for two-way communication on twenty-four channels, the individual channel signals being themselves amplitude modulated on subcarriers and, as a group, frequency modulated upon an ultra-high frequency or microwave radio carrier. Such a system is essentially a "constant equivalent" system, i. e., the level of the power output of the receiver into each of the channels bears a constant ratio to the level of the power fed into the transmitter from the corresponding channel at that end of the circuit. The equipment must be designed so that over-modulation will not occur even if all circuits are in use at the same direction at the same time. This, however, will practically never occur. Telephone experience has shown that even at periods of peak load the time required for accepting calls, making switches, and the inevitable waits following the relinguishment of a channel by one party before it can be seized by another, result in a maximum utilization of only from 90% to 95% of the channels at any one time. Further, on the average, only one-half of the persons at one end of the line will be talking, while the other one-half will be listening, thus providing 3 db of available but unused modulating range at the transmitter. Moreover, the periods of peak load are themselves a relatively small portion of a twenty-four hour day, and an even greater reserve modulation capacity will therefore exist during the greater part of the time.

Circuits of the character mentioned will be designed to give their normal signal-to-noise ratio under the ordinary conditions of transmission. Periods of poor transmission do occur, however, with more or less regularity. These may be periods of fading of radio signals, or they may be periods of high noise level due to electrical or magnetic storms or other interference. In any case, such intervals of poor transmission raise the absolute noise level at the receiving end of the circuit.

In the case of radio circuits, some improvement can be effected when such periods of poor transmission occur by riding the controls at both ends of the circuit, in order to raise the percent of modulation to the maximum permissible in view of the circuit loading. This requires close coordination between the ends of the circuit, and is so approximate at best that it is only under extreme conditions that it results in enough improvement to make it worth while. An automatic and practically instantaneous adjustment which will maintain maximum permissible modulation at all times will give a systematic over-all improvement in the operation of any given circuit, make it operable under otherwise impossible conditions, or (which is another aspect of the same thing), make possible longer circuits which meet the same signal-to-noise specifications as shorter ones wherein such equipment is not employed.

Stated broadly, therefore, the primary object of the present invention is so to control the signals transmitted over a communication channel as to maintain a maximum signal-to-noise ratio within the power capabilities of the system. Pursuant to this broad purpose, among the objects of the invention are to provide means for automatically regulating the gain of signals to be transmitted over a communication link to the maximum permissible value within the capabilities of the system and, simultaneously, to regulate the gain at the receiving ends of the system so that the over-all equivalent of the system is a constant; to provide means for regulating the gain at the receiving end of a system as above stated, in a manner which employs degenerative instead of regenerative elements, so that the system as a whole is inherently stable; to provide means, in a multichannel system, of automatically regulating the power gain applied to each channel substantially in inverse ratio to the number of channels in use, while simultaneously regulating the gain at the receiving end of the system in direct ratio to the number of channels so used; to provide a multichannel communication system wherein the signal-to-noise ratio in each channel is at all times the maximum possible in view of the available power of the transmitter; to provide a system wherein the level of modulation referable to any individual channel is changed automatically and substantially instantaneously to insure maximum utilization of transmitter power without causing harmonic, amplitude, or other distortion or change of level in the signal delivered to the auditor on said channel, and to provide a system wherein the above mentioned advantages are secured automatically and without the necessity of an operator in attendance to manipulate gain or other controls.

In the present invention, as considered broadly, signals of varying amplitude, whether from a single channel or a plurality of channels, are combined with a component of constant amplitude. The constant amplitude component may be a constant frequency pilot signal, in which case it is preferably of materially lower amplitude than the mean of any of the single message signals with which it is combined, or it may be itself a message signal or a single component thereof, such, for example, as a frequency modulated voice signal, a frequency shift telegraph signal, or the transmitted carrier of an amplitude modulated signal. The combined signals are then passed through an automatic gain control device or "AGC," which varies in gain as an inverse function of the total energy input thereto. Preferably the function selected is the reciprocal of the mean amplitude of the input signals, integrated over a selected period which may be as short or even shorter than the syllabic rate of ordinary speech (approximately ⅕ second) or a longer interval, depending upon the condition of the particular circuit to be controlled. As a result of the action of the automatic gain control, the signal in the output of the device approaches the constant level more or less closely, depending upon the inverse function employed. The amplitude of the originally constant-amplitude component in the composite signal will therefore vary, and it appears in the output of the automatic gain control, directly as the gain of the latter device or inversely as the amplitude of the composite input signal. The substantially constant-level composite signal resulting is then modulated upon a common carrier at the maximum level which will not produce over-modulation (if the system is such as to require such modulation) and is then transmitted over the communication link of the system.

At the receiving end of the link, which is preferably but not necessarily of the constant-equivalent type, the signal, if modulated, is demodulated or detected and the modulating component is again passed through an automatic gain control. The originally constant-amplitude component is filtered from the composite signal, usually amplified, and is so applied to the second automatic gain control as to maintain its output level substantially constant. In this case, however, the period over which the signal is integrated may be as short as desired, provided that it is long enough to respond to the amplitude of the component and not to individual cycles thereof. The response time of the receiver AGC can therefore be made very short and should, in any event, be shorter than that of the similar device at the transmitter.

Automatic gain controls of the constant-output-level type are inherently stable, tending to correct their own faults or misadjustments instead of accentuating them. The total output level of the gain control at the receiver may vary widely, but so far as the control signal is concerned, it is of the constant level type and acts degeneratively instead of regeneratively on the control signal, thereby tending to maintain it at a constant value. Theoretically, it is possible with the system of this invention to maintain the average level of the signals transmitted over the communication link a constant to within as small a degree of tolerance as may be desired and, at the same time, to make the transmission equivalent of the circuit as a whole, between the input of the transmitter AGC and the output of the receiver AGC a constant, again to within as close a tolerance as may be wished. Inaccuracies of adjustment, failure to meet manufacturing tolerances, or the like may therefore lead to less than perfect functioning, but they normally would not lead to singing of the circuit with consequent complete disruption of communication. The initial control at the receiver is degenerative and therefore stable. It is not a mere compressor, reducing differences in average amplitude but still leaving high amplitudes relatively high and low amplitudes low, although to a lesser degree than in the input signals. On the contrary, it may, if desired, hold its output level completely constant. It is not necessary to leave the amplitude differences within the composite signal, in order that they may be operative at the receiving end of the circuit to reaccentuate their differences regeneratively, in order to re-establish the signal in its original form. This brings out one highly important difference between the present invention and the compandor; with the latter device compression of the signal reduces the amount of information transmitted, while with the system of this invention the greater the compression the greater the information carried by the signal, within wide limits of compression. Instead, the control signal at the receiver decreases when the amplitude of the composite signal should be decreased. Neither is it necessary that the operation of the gain controls be linear, although linearity of response is more important at the receiver AGC.

Reference has already been made to the reserve latitude in modulating capacity which must be allowed for instantaneous peaks of speech energy. As the number of channels increases in a multichannel system, the probability that such instantaneous peaks in speech energy will exist simultaneously in a plurality of circuits becomes smaller and smaller. For example, an allowance of 6 to 8 db above average maximum may be made for instantaneous peaks in a single channel. Where many channels are imposed upon a common carrier, however, the probability that this reserve would be required for all channels simultaneously would become very small indeed. The reserve modulating power required when all channels of a multichannel system were operating simultaneously, may be materially less than that required for a single channel. Hence, in an extreme case, the AGC at the transmitter might be set so as to leave no margin for speech peaks when all channels were operating simultaneously, while leaving an assumed 6 db latitude with respect to the average level on a single channel to take care of the instantaneous peaks. Such variations from the theoretically desirable constant-output level from the transmitter AGC are contemplated as within the scope of the invention.

All the above will be more readily understood by reference to the ensuing more detailed descriptions of systems embodying the invention, taken in connection with the accompanying drawings wherein.

Figures 1, 3:
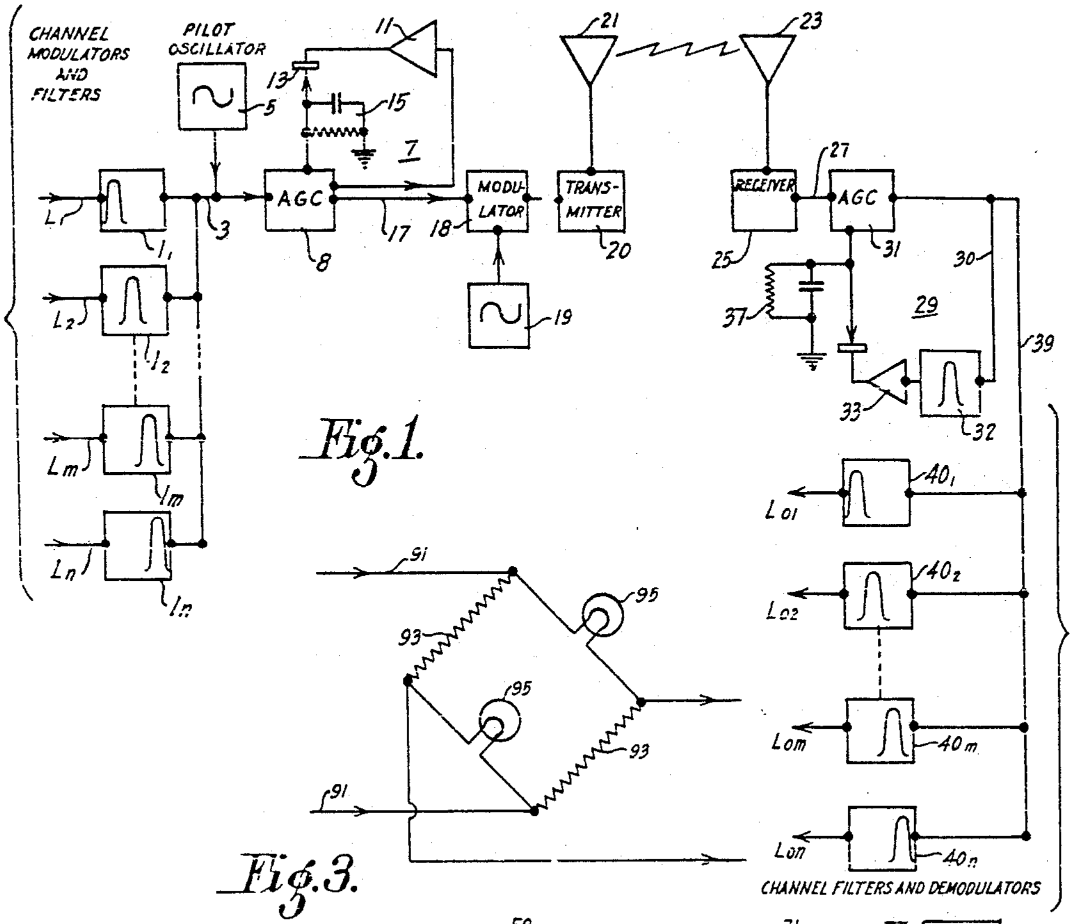
Fig. 1 is a diagram, principally in block form, illustrating the application of the invention to a multichannel, frequency-modulated radio telephone system.
Fig. 3 illustrates schematically a form of automatic volume control which may be employed in lieu of those illustrated and described in Figs. 1 and 2.

Considering first Fig. 1, the system illustrated therein is one adapted for the use in a radio link incorporated in a commercial toll telephone line. The drawing illustrates a one-way system only, since the return link of the system would be an exact duplicate except, possibly, for the pass bands of the filters in the individual channels.

As the drawing shows, incoming lines $L_1, L_2 \ldots L_m, L_n$, corresponding in number to the channels provided for in the transmitter, terminate in the usual input carrier-terminal equipment comprising balanced modulators and single sideband band-pass filters which shift the incoming voice frequencies from each of the incoming lines so that the signal from each channel occupies a specific portion of the entire spectrum allotted to the transmitter. The modulating and filter equipment is symbolically indicated by the blocks $\mathbf{1}_1, \mathbf{1}_2 \ldots \mathbf{1}_m, \mathbf{1}_n$. In a twenty-four channel system, this might be the band from 300 cycles to 96 kilocycles (allowing for one voice frequency channel and allotting 4 kilocycles to each channel) or, for various reasons, a band of the same width occupying some other portion of the frequency spectrum. The outputs of the channel terminal equipment are connected in parallel to a common circuit 3.

Also feeding into this common circuit is the output of a pilot oscillator 5. The frequency of this oscillator might be somewhere in the middle of the band or at one end thereof. Thus, for example, it might be tuned to a frequency of 49 kilocycles, or, perhaps, 97 kc. If should, however, be of substantially constant frequency and amplitude so that the signal delivered by it is unmodulated and substantially pure and hence will not interfere with any of the other frequencies involved in the system. The pilot frequency is preferably supplied to the common circuit at a level 10 to 16 db below the average level of the signals from any one channel.

The common circuit 3 feeds an automatic gain control generally designated by the reference character 7. One example of such a gain control is an amplifier using vacuum tubes, such as pentodes of the remote cutoff type, the amplification of which may be varied by the magnitude of a D. C. potential applied to the grids of the tubes, the gain of the amplifier going down as the negative bias upon the grids is increased.

In the diagram it is this type of control which is shown. The output of a variable-gain amplifier 8 is connected to a branch circuit 7. In this branch circuit is a high gain amplifier 11 supplying a rectifier 13. The amplifier 11 must be operative over the entire width of the band to be controlled, including the frequency of the pilot oscillator; in the case supposed, it should handle the band between 300 cycles and 97 kilocycles.

The rectified current feeds an integrating network 15 (which may consist of a condenser and resistor in parallel as shown) the time constant of which is preferably sufficiently great to prevent short instantaneous peaks from affecting violently the gain or loss produced in the gain control 7. There is a fairly wide latitude of design as to this network; its time constant may be of the order of 20 to 50 milliseconds, which would permit the AGC to respond at a syllabic rate, or, in view of the fact that in the system shown its primary purpose is to control variations in the number of channels rather than those in an individual channel, a longer time constant may be desirable.

The constant-level composite signal from the control 7 is supplied through a lead 17 to a modulator 18 which modulates it upon a high frequency main carrier wave generated by a suitable oscillator 19, and thence to a transmitter 20. The latter may include frequency multiplying and further amplifying means and is here assumed to be of conventional character. The modulation may be of any known type; amplitude, phase, frequency, or pulse. Assuming, however, a frequency modulated radio link, the signal is transmitted from an antenna 21 and picked up by a receiving antenna 23 connected to a constant-equivalent receiver 25. In the case of the frequency modulated signal here assumed, this would involve merely that the receiver be supplied with a limiter and have sufficient amplification so that, irrespective of fading experienced on the radio link, the signal level fed to the limiter will always be great enough to bring the limiting action into play. Amplitude modulation will always require the use of an automatic gain control if constant-equivalence is to be achieved. This is a desirable but not a necessary characteristic, as constant-equivalence in the final output of the system is provided by the invention itself.

The output signal from the receiver into circuit 27 will, under these circumstances, normally comprise the same frequencies as those supplied by the terminal equipments $\mathbf{1}_1$, $\mathbf{1}_2$ etc., and by the pilot oscillator 5. This will not necessarily be the case, however, since all of the frequencies may be shifted by heterodyning to a band of the same width in some other portion of the frequency spectrum.

Assuming, however, that the output frequencies bear a one-to-one relationship to the input frequency, they are fed through lead 27 to an automatic control 29 which may be either an amplifier or a losser, as in the case of the control 7. Frequently, for obvious reasons, it will be a substantial duplicate of the level control 7, but the control 29 may be a losser while the control 7 is an amplifier, or vice versa. As shown, however, an output circuit 30 from a variable-gain amplifier 31 feeds a sharply tuned, narrow band filter 32, which passes only the frequency of the pilot oscillator 5 or the corresponding frequency to which the oscillator output has been shifted. The selected pilot signal is first amplified by a high gain amplifier 33 before being fed to a rectifier 35, and thence through an integrating network 37 back to the level control to vary the output of the latter.

In the exercise of control by the automatic gain control 29, the same principles apply as have already been discussed in connection with the control 7. The apparatus operates in this case, however, to keep the level of the pilot signal a constant, this being the only portion of the composite signal which reaches the rectifier 35. Since the pilot signal fed to the level control will vary approximately inversely as the number of channels momentarily in operation, keeping the level of this signal constant in the output of the control 29 will cause the total power in the output to vary substantially directly as the number of channels in use. As the gain of control 7 varied the power approximately inversely as the number of channels, the signals in each channel will now bear a constant relation to the level of the signals as supplied through the circuit 3 to the level control 7, which is what is desired. In other words, the constant amplitude input signal to the transmitter AGC is a varying fraction of a varying input level, and in the output of that AGC it becomes the same varying fraction of a constant-level signal. The receiver AGC operates on the pilot signal to restore it to constant level. Simultaneously, it operates on the other components of the received signal to vary the gain applied to them in the same degree as that applied to the pilot signal, so that the total output signal is again of varying level, bearing a constant ratio to the level of the signals fed into the system. Thus if the mean amplitude of the signal fed to the first AGC be termed A, the amplitude A′ of the pilot signal in the output thereof is equal to the constant output $C$ times $1/A=C/A$. At the receiver, the gain of the second AGC is some constant $$E\times 1/A'=E/A'$$

or $E\div C/A=EA/C$. The entire composite signal C is multiplied by this same factor so that the total output level of the system becomes $C\times EA/C=EA$, where E is constant. This assumes unity transmission equivalent in the system between the transmitter and the receiver, but the same reasoning holds in a variable equivalent circuit; the output level of the system varies directly as the input.

It should be emphasized that it is not necessary that the transmitter AGC be designed to vary the gain directly as $1/A$. The effective or RMS potential in a circuit varies as the square root of the power the circuit is carrying or the square root of the sum of the squares of the voltages of the individual frequencies in the various input circuits. There is a theoretical possibility that at some instant all components of a composite signal may reach a peak in the same direction, in which case the instantaneous amplitude will be the sum of the individual amplitudes. Illustratively, in the case of twenty-five different frequencies of equal amplitude, the peak potential could be twenty-five times the value of the instantaneous peaks of the individual signals, although the RMS potential of the combined frequencies would be only five times that of the individual signals.

With the random frequencies of voice communication, the probability of such simultaneous peaking becomes fairly small, although such occurrences are one factor in the instantaneous peaks that have already been referred to. As more channels are added, the probability of simultaneous peaking becomes more and more remote.

Since it is peak potential (or current) values that cause over-modulation, account must be taken of the fact that simultaneous peaking of some frequency components will certainly occur and that simultaneous peaking of all components conceivably might occur. The probability varies with the type of communication involved; there will be one probability in telegraph circuits and a different one in voice circuits. Practically, the chances of a 100% coincidence of peaks are so remote as to be disregarded. It may, however, be advisable to vary the gain at the transmitter in such a manner that the average level of output is somewhat lower when few channels are occupied than when all are in use, in order that the peak level remain substantially a constant.

With speech frequencies, however, maintenance of the average level at constant value probably gives best results in over-all performance, and at present is the preferred method of operation, since the composite signal is a large number of frequencies of random amplitude and phase. This, of itself, tends toward a relative constant ratio between average and peak amplitudes. With telegraph channels, where communication is by shaped pulses whose components have predetermined amplitudes and phase relationships, a different gain function might be employed, and such different function is within the scope of this invention.

Whatever the gain characteristic of the transmitter AGC may be, that at the receiver should, for best results, hold the level of the pilot signal as nearly constant as possible, as this will result in complete restoration of the amplitude ratios in the input signals. These signals, passing through circuit 39, feed channel filters and demodulators $\mathbf{40}_1$, $\mathbf{40}_2$ . . . $\mathbf{40}_m$ and $\mathbf{40}_n$, corresponding to the filters and modulators on the transmitting end of the circuit, and thence output lines $L_{o1}$, $L_{o2}$ . . . $L_{om}$ and $L_{on}$.

It has been stated that the AGC 29 may be made substantially similar to the device 7. Each exercises the function of maintaining its output level constant with respect to some particular quantity. In the case of the device 7, however, this is a highly complex composite signal containing a wide band of frequencies, all varying in amplitude, and it responds to the average of these signals integrated over a period of time. The device 29, however, responds to a signal of a single, sharply defined frequency which is not itself subject to any variations except those imposed by the relatively slowly responding AGC 7. The time constant of the integrating network 37 need therefore only be sufficiently great substantially to remove the alternating current component from the pilot frequency itself. If, therefore, the time constant of the network is only a few times as great as the period of the pilot frequency, it will accomplish its function satisfactorily.

If the pilot frequency be chosen in the upper range of the spectrum, as, for example, the 97 kilocycles suggested above, and the time constant of the integrating circuit 37 be made equal to approximately 5 cycles of the pilot frequency, the integrating circuit will build up its corrective D. C. voltage to within about one-third percent of its final value within one four-thousandth of a second following even an instantaneous change in the level of the signal fed to the control 29. One four-thousandth of a second is materially less than 1 cycle of the highest frequency to be carried by the voice channel. Owing to the relatively long time constant of the network 15, no instantaneous changes in the level of the pilot signal can occur, and the change in level over periods even much longer than the one four-thousandth of a second mentioned will therefore be relatively small. For all practical purposes, therefore, the receiving circuit may be considered to follow and compensate for the variations in channel level without lag, and it is for this reason that, as has been stated, the level control 7 may, if desired, be made to operate in a period of the length of a syllable or even less without causing distortion effects in the over-all circuit. It should be kept in mind, however, that if the filter which selects the pilot signal and feeds it back to control the gain be too sharp, it will not pass instantaneous variations in pilot signal amplitude. A narrow band-pass filter is therefore to be preferred to a sharply resonant single-tuned circuit, such, for example, as a crystal. The filter must accommodate a sufficiently wide band to accept the sidebands generated by variations in pilot amplitude. It is to be understood that it is by no means necessary that the frequency pilot signal be as high as suggested above, or that the response of the receiver gain control be as rapid. The example given is selected as showing the wide flexibility of the invention; other considerations, such as the somewhat rigorous requirements of any feedback amplifier which is to work over a wide band, may lead to the choice, for example, of slower response times.

While this invention has some special advantages when applied to multichannel systems such as the one described above, it may also be used to improve the quality of transmission of a channel carrying a single signal of varying amplitude. This can be done in the same manner that has already been described in connection with the multichannel system, the only requirement being that the time constant of response or attack time of the filter 15 be made small enough so that the AGC 7 will respond at a syllabic rate or faster.

It is practically always necessary, however, to accompany voice signals with ringing, dialling, or other switching information, such information usually being transmitted on frequencies lying outside of, but closely adjacent to the voice frequency band. Frequently, moreover, a telegraph channel is imposed upon a voice frequency circuit.

Whether or not the circuit carries separate telegraph messages, the dialling or similar auxiliary signals transmitted by the line are essentially telegraphic in nature, the signals transmitted representing either a "mark" or "space."

A method of telegraphic signalling which has come into increasing use employs "frequency shift." This is essentially a frequency modulation system, wherein the energy transmitted is a constant but is shifted from one frequency to another differing only slightly therefrom in accordance with whether a "mark" or "space" signal is being transmitted.

It should be obvious that since in this type of signalling the signalling frequency is always present and at constant amplitude, it may be used in place of the pilot signal described in the explanation of Fig. 1. Like the pilot signal, it may be transmitted at lower level than the variable-amplitude signal, because of the ability of a single tone, wherein all of the energy is concentrated, to override and be distinguished through random frequencies or noise.

Figure 2:
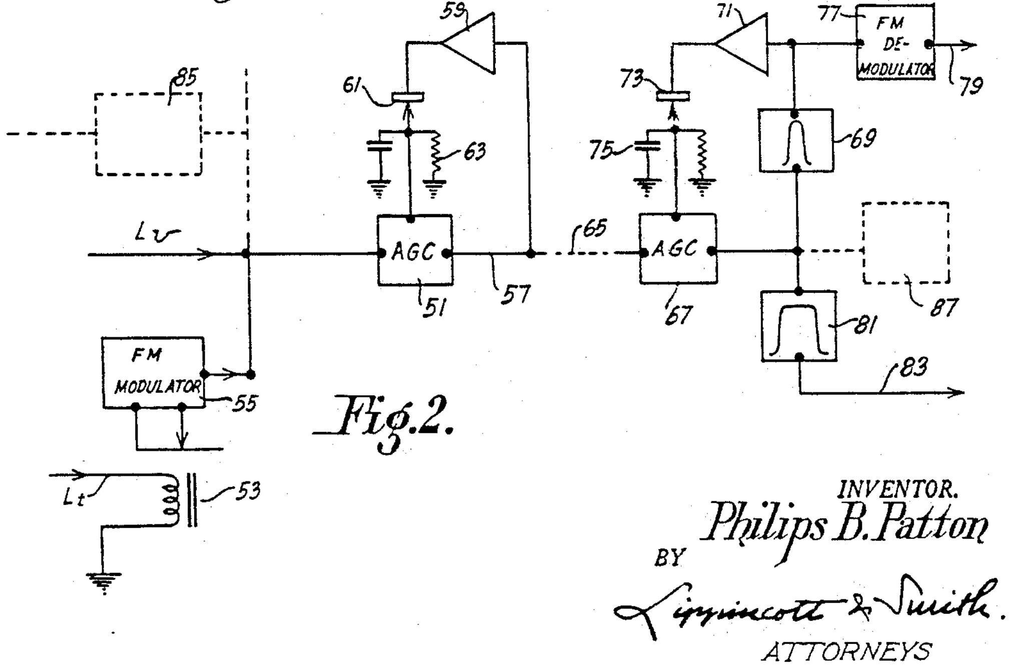
Fig. 2 is a similar block diagram of a slightly different form of the device as employed over a metallic line.

Fig. 2 illustrates a system of this character. An incoming line $L_v$ carries the variable-amplitude signal which may be fed directly into the automatic gain control amplifier 51. A telegraph or signalling line $L_t$ operates a relay 53 to key a frequency modulator 55, also connected to the input of AGC amplifier 51.

One well known form of frequency modulator for telegraph purposes is simply an oscillator, the frequency of which is varied by connecting an inductance or capacity in parallel with the tank circuit which controls its frequency, but other types of frequency shift transmitters are well known and the type mentioned is merely illustrative.

The AGC here shown is of the same character that has already been described, feeding a portion of the energy from the amplifier output circuit 57 back through a high gain amplifier 59 and rectifier 61 to a short-time constant integrating circuit 73 which controls the gain of the composite signal to maintain the average output level substantially constant irrespective of input variations. The signal is then transmitted over the link 65, which may be either wire or radio, to the receiver AGC 67.

In the output of the second AGC, the signal divides, part passing through a narrow-band-pass filter 69 which selects the telegraph signal, applying part of it through a high gain amplifier 71, rectifier 73 and integrating circuit 75 to control the gain of AGC 67. The same frequency-shifted signal is also applied to the FM demodulator or discriminator 77 and thence to the output line 79 where it may be used for its intended purpose.

The voice frequency signal is also passed through a filter 81, which excludes the frequency-shifted control wave, and thence to subscriber line 83.

Carrier circuits, such as are indicated by the terminal equipment indicated by dotted lines at the reference characters 85 on the transmitting end and 87 on the receiving end of the circuit, can, of course, be added, making the system practically identical with that shown in Fig. 1 except for the fact that the pilot signal varies in frequency, although not in amplitude, and thereby can carry message information.

Carrying the idea one step farther, it should be apparent that the frequency modulated wave need not necessarily be limited to telegraph signals, but that a frequency-modulated voice signal can be used for the same purpose. The gain in over-all channel carrying capacity is not quite so great in this latter case, since the frequency modulated signal cannot be reduced as far below the level of the voice-modulated channel or channels with which it is associated. In a two channel system such as is illustrated in Fig. 2, half of the transmitter power would, on the average, be devoted to the constant amplitude message. In a multichannel system, however, a very appreciable gain in quality in over-all performance can be realized.

In what has been said up to this point, it has been assumed that the input to the system, insofar as the variable amplitude signals are concerned, is either the unmodified voice frequency or single sideband, carrier suppressed, carrier transmission. Certain carrier communication systems, however, do not suppress the carrier itself. In systems of this character, the transmitted waves may be analyzed into a carrier component of constant frequency and amplitude plus sidebands carrying (at 100% modulation) equal energy but of variable amplitude and frequency. It is well known that the carrier may be filtered out of such systems by appropriately sharp filters. The same holds with regard to frequency modulated signals where the degree of modulation is not too great.

Since the carrier amplitude is a constant for a degree of modulation up to one hundred percent and can be selected from the modulation products of either an FM or an AM system, it should be obvious that such a carrier may be used as the pilot frequency in the system of this invention. A system employing a pilot frequency of this character is not separately diagrammed, since in a radio circuit the only differences from the arrangement shown in Fig. 1 would be the omission of the pilot oscillator plus the fact that at least one of the channel modulators would have to be of the carrier-transmitted type, and the filter associated therewith would have to have a broad enough pass band to accommodate the carrier as well as the sidebands. There would be no difference whatsoever in the diagrammatic representation of the receiver, the only requirement being that the filter 32 have a narrow enough pass band to select the carrier chosen as the pilot from the accompanying frequencies. It must be kept in mind, however, that the filter must be wide enough to pass the modulation imposed upon the pilot frequency by the transmitter gain control, and if the sidebands originally modulated on the carrier have periods of the same order of magnitude as the time-constant of the transmitter gain control, separation of the two types of modulation may not be possible.

Frequently, however, modulation is carried out in a number of steps involving successive sub-carriers which are more and more widely spaced from the sidebands which they carry. Where this is the case, the carrier may be selected from its associated sideband frequency by a filter having a wider pass band and a correspondingly shorter time of response.

Under these circumstances, it might appear that no advantage would accrue from using the carrier frequency as a pilot and that there might be some actual disadvantage in that the pilot-carrier would normally carry more energy than would be necessary where an independent pilot frequency is used, the pilot signal, when used as a carrier, requiring transmission at least as high a level as the sidebands modulated upon it and usually a level considerably higher, whereas the separate pilot may be at ten or more db below the sideband level. It is sometimes desired, however, that at least a vestigial carrier be transmitted in order to synchronize heterodyning oscillators at the receiving end of the circuit. Where this is the case, the transmitted carrier may be made to do double duty as the pilot signal. As a modification of this idea, a sub-carrier or intermediate carrier may be employed in a balanced modulator which suppresses it as far as the message channel is concerned, but a frequency from the same source may be injected into the system, at its original or a lower level, the carrier generator then becoming the pilot oscillator 5 of Fig. 1.

Throughout this specification, the term automtic gain control or AGC has been used. It is to be understood that this term is used in its broad sense to include not only a variable amplifier but a variable losser, the gain then becoming a fractional quantity in terms of amplitude or a negative quantity in terms of decibels. One very simple form of such variable losser is shown in Fig. 3. In this device, the input signal from a line 91 is applied across the diagonals of a bridge circuit comprising a pair of fixed resistors 93 in opposite arms of the bridge and a pair of resistors 95, the resistance of which varies with load, in the other two opposite arms of the bridge. The resistors 95 are shown as incandescent lamps, such as tungsten lamps, the coefficient of resistance of which is such that their hot resistance is several times (four to five) that which they possess when cold. The values of the arms would, in this case, be so chosen that the arms 93 would have a resistance materially greater than the cold resistance of the lamps 95. The bridge would, therefore, be very far from balanced at light load. With increasing load carried by the lamps, the resistance would rise and the bridge come nearer to balance, so that the output may be made to approach quite closely a constant level. In a circuit of this character, the heat storage capacity of the lamp filaments acts to integrate the signal energy. Similar bridge circuits may be built with elements having a negative coefficient of resistances, as, for example, thermistors.

Such devices as that shown in Fig. 3 are generally more applicable at the transmitting end of the circuit than at the receiver, where amplification is almost always necessary and where a greater accuracy of control than that required at the transmitting end is desirable.

Variable lossers may, however, be used at the receiving end as well, as, for example, by using resistance elements indirectly heated by the amplified pilot frequency. Numerous varieties of automatic gain control are well known, and although some are more suitable than others for employment in this invention, almost any of them may be adapted for use therein. The more closely the pilot frequency is maintained constant in the output of the receiver AGC, the greater will be the statistical improvement of the performance of the circuit as a whole, but a considerable such statistical improvement may be obtained even though the receiver AGC output level be even only a rough approximation of constancy. The communication art necessarily deals largely with statistical probabilities and not with absolutes. The desirable transmission characteristics will, as has already been pointed out, vary with the character of the signals to be transmitted and with the number of channels carrying such signals. It is therefore desired that the invention as set forth herein be protected as broadly as possible within the scope of the appended claims, and that the illustrations herein given be considered illustrative merely, both as to apparatus and as to gain characteristics, and not as limitations upon the claims except as specifically set forth therein.

I claim:

1. In combination with a communication system including a plurality of message channels supplying a single circuit with a composite signal of varying amplitude; an additional channel connected to said single circuit and comprising means for generating a carrier wave, means for frequency-modulating said wave to supply to said composite signal a frequency modulated component of substantially constant amplitude, automatic gain control means connected to said single circuit and operative in response to said composite signal to vary the amplitude of all components thereof as an inverse function of the amplitude of said composite signal, a transmission link supplied by said automatic gain control, receiving means connected to said transmission link, a filter connected to said receiving means for selecting from said composite signal said frequency-modulated component, and automatic gain control means connected for actuation by said frequency-modulated component and operative to maintain the amplitude thereof in the output of said receiving means at a substantially constant level.

2. The method of transmitting a composite signal comprised of components of varying frequency and amplitude which includes the steps of modulating at least a portion of said signal components upon a carrier frequency wave of substantially constant amplitude, varying the amplitude of all components of said composite signal in inverse proportion to the original amplitude thereof to produce a resultant signal of substantially constant amplitude, transmitting said resultant signal over a single communication link, receiving said signal, separating said carrier from the composite signal, and causing the separated carrier signal to vary the amplitude of the composite signal in such manner as to maintain the amplitude of the carrier signal substantially constant.

3. The method of transmitting a composite signal comprised of components of varying frequency and amplitude which includes the steps of frequency-modulating a portion only of said signal components upon a carrier wave to produce a substantially constant-amplitude modulated wave, mixing said constant-amplitude wave with the other signal components and so producing a varying-amplitude composite wave, varying the mean amplitude of said composite wave substantially in inverse proportion to the original amplitude thereof to produce a resultant signal of substantially constant mean amplitude, transmitting said resultant signal over a single communication link, separating from the resultant signal the frequency components representative of said constant-amplitude modulated wave, and causing the separated components to vary the amplitude of the entire composite wave so as to restore said separated components to a substantially constant amplitude.

4. The method of multichannel communication which comprises the steps of developing a plurality of message signals of different frequencies, modulating at least one of said signals upon a carrier frequency, mixing varying numbers of said signals to produce a composite signal of varying amplitude, simultaneously varying the amplitude of all of the mixed signals to produce a resultant signal of substantially constant amplitude, transmitting said constant-amplitude signal over a communication link, amplifying said composite signal, separating said modulated carrier signal from said composite signal, deriving from said separated carrier a control voltage the magnitude whereof varies in accordance with the variation in amplitude of said carrier, and applying said voltage to vary the amplification of said composite signal as an inverse function of the variation in the amplitude of said carrier to maintain the same at substantially constant amplitude, and then separating the remaining message signals.

References Cited in the file of this patent

UNITED STATES PATENTS

| | | |
|---|---|---|
| 2,149,727 | Conklin | Mar. 7, 1939 |
| 2,171,048 | Rockwell | Aug. 29, 1939 |
| 2,231,538 | Kreer | Feb. 11, 1941 |
| 2,300,415 | Green | Nov. 3, 1942 |
| 2,314,707 | Katzin | Mar. 23, 1943 |
| 2,421,727 | Thompson | June 3, 1947 |
| 2,539,426 | Jacobsen et al. | Jan. 30, 1951 |